7393X
NO PRINTED SPECIFICATION AVAILABLE
S. Watrous.
Paint Mill.
Patented Jan. 26, 1833.
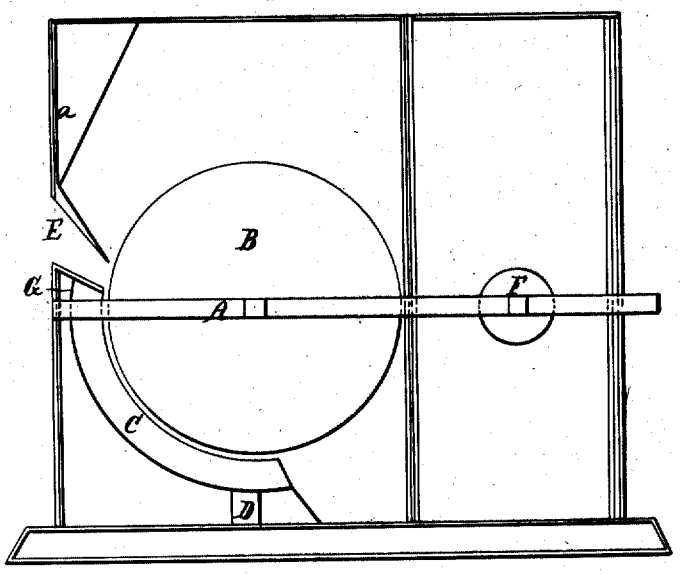

7343X Jan 26. 1833 Jan 26, 1833
427

Silas Watrous. Groton. New London County Ct.
Letters Patent.

The Schedule referred to in these Letters Patent. and making part of the same Containing a description in the words of the said Silas Watrous himself of his improvement in the Mill. for Grinding White Lead Spanish & Paris White, in its dry State, To all to whom these presents shall come: Be it known that I Silas Watrous of the Town of Groton, County of New London, and State of Connecticut have invented a new and useful improvement in a Mill for Grinding White Lead. Spanish & Paris White in its dry State. and that the following is a full and exact description of the construction and operation of said Mill. as invented or improved by me —

This mill consists of the following parts viz A Frame made of plank of any convenient width, height & thickness with a top & bottom to it, with a partition in it past the middle as may be seen by a front view of the subjoined drawing mark, aaa. thro this plank frame runs an iron Shaft marked A. on which iron Shaft, in one of the apartments between the plank or frame of said Mill, is hung a Mill Stone of a cylindrical form and hung on said iron Shaft, exactly the same as a common grind Stone is hung on its crank, and calculated to run in the same manner. as will appear by an end view of said mill & Stone marked B. this mill Stone is to be made of sharp granite Stone, and the outward circumference or surface to be nearly Smooth, this mill Stone runs in a bed Stone made convex exactly to fit the outer circumference of the runner as may be seen by an end view of said bed Stone marked C. and extending about one third of the distance round the runner, under this bed Stone is a key made of wood marked D. the use of which is to key the bed Stone close to the runner (this runner may be of any convenient diameter to suit the situation & business where the mill is to be placed, on one side of this mill is a hopper marked E. into which the paint is fed

7393X before it is ground the outer surface of the runner coming in con-
tact with it, carries it through the Mill & discharges it on the opposite
side. The front side of this mill is boxed up from the top. down as low
as the centre of the runner & so close to the surface of the same, as to pre-
-vent any paint from being carried back on its surface. Towards
the end of the iron shaft above mentioned in one of the apartments
of the frame is a pulley marked F. for a band to run on to turn said
mill. this mill can be attached to any water or steam power by
means of a band only. the upper end of the bed stone of this mill
is hung by an iron pin on each side of it marked G.

Witnesses
Nathan Daboll
Rufus Allyn

Silas Watrous

Exd. [illegible]

(567 words)

(Patented 21st Jany. 1833)

(Dr in portfolio)